United States Patent

[11] 3,566,728

| [72] | Inventor | Atsushi Ohmasu<br>1020 Sannoya, Isogo-cho, Isogo-ku,<br>Yokohama-shi, Japan |
|---|---|---|
| [21] | Appl. No. | 780,516 |
| [22] | Filed | Dec. 2, 1968 |
| [45] | Patented | Mar. 2, 1971 |
| [32] | Priority | Dec. 5, 1967 |
| [33] | | Japan |
| [31] | | 42/102105 |

[54] TRAVELLING CUTTING MACHINE FOR USE WITH AN EXTRUSION PRESS
3 Claims, 6 Drawing Figs.

[52] U.S. Cl. .................................................. 83/80,
83/160, 83/292, 83/295, 83/319
[51] Int. Cl. ..................................................... B26d 1/56,
B23d 25/04
[50] Field of Search ....................................... 83/160,
292, 295, 318, 319, 320, 80

[56] References Cited
UNITED STATES PATENTS

| 1,848,288 | 3/1932 | Welch | 83/160X |
| 1,859,319 | 5/1932 | Sussman | 83/318X |
| 1,946,926 | 2/1934 | Barton | 83/295X |
| 2,834,156 | 5/1958 | Oberlin | 83/318X |
| 3,082,656 | 3/1963 | Day, Jr. et al. | 83/320 |
| 3,251,255 | 5/1966 | Bauman | 83/295 |

*Primary Examiner*—James M. Meister
*Attorney*—George B. Oujevolk

ABSTRACT: The travelling cutting machine for use with an extrusion press according to the present invention comprises a truck freely movable in the direction in which a continuously manufactured metal rod is carried, a cutter provided with blades for cutting the metal rod carried on the truck, a drive means for causing the truck to travel back and forth, a magnetic clutch or eddy-current coupling motor for coordinating the travelling velocity of the truck with that of the metal rod by connecting or disconnecting the truck with the drive means and a means for operating the truck and cutter by detecting the length of a metal rod continuously drawn out of a manufacturing apparatus, thereby to cut the metal rod by turns to a prescribed length at all times without causing the deformation of the rod.

Patented March 2, 1971

Atsushi Ohmasu
INVENTOR.

BY George B. Oujevolk
Attorney

TRAVELLING CUTTING MACHINE FOR USE WITH AN EXTRUSION PRESS

CROSS REFERENCES TO RELATED APPLICATION

The present invention represents a further development of the apparatus disclosed in the preceding U.S. Pat. No. 549,995 filed by the same applicant on May 13, 1966, now Pat. No. 3,442,167.

BACKGROUND OF THE INVENTION

The present invention relates to a travelling cutting machine for cutting to a prescribed length a red hot metal rod immediately after being drawn out of, for example, an extrusion press.

Metal rods such as round, square, or shape steel materials remain red hot and soft immediately after being continuously manufactured by hot working, for example, by an extrusion press, so that unless cooled for a certain length of time, they present difficulties in being cut to a prescribed length for storage. Accordingly, a cooling means for such continuously manufactured metal rods has to be extremely elongated with the resultant necessity of installing large scale equipment to resolve these difficulties, it may be deemed sufficient simply to cut to a prescribed length the metal rod which still remains red hot immediately after production. To this end, however, there will arise the need unceasingly to cut a long piece of continuously manufactured rod material. If, in this case, the operating velocity of such cutting means fails to accord with the extrusion velocity of metal rods then there will be raised the problem that the rod will per chance be forcefully drawn to excess or unduly contracted, making it difficult to manufacture rod materials having a desired diameter. With an extrusion press for manufacturing particularly such rod materials, the extrusion velocity will widely vary with its capacity, the material and diameter of rods to be manufactured, etc. Further with rods of the same material and diameter the extrusion velocity will continuously change with the temperatures prevailing at the time of extrusion.

Speaking, for example, of the general case where a billet 200 mm. in diameter and 600 mm. long of copper, aluminum, brass, etc. is introduced into an extrusion press in a state heated from 500 to 900° C. and extruded through a die with a prescribed cross section. The length of the rod is inversely proportional to the square of the radius of the billet. Said billet may be extruded in 30 seconds into a round rod 36 mm. in diameter and 18 m. long, whereas the same billet can be made in the same length of time into a round rod 17 mm. in diameter and 83 m. long. Namely, the travelling velocity of the round rod is 0.6 m/sec. for 36 mm. in diameter and 2.8 m/sec. for 17 mm. in diameter. Thus, it will be seen that a very slight change in the cross-sectional area of a die will lead to a prominent difference in the travelling velocity of extruded material. Accordingly, the cutting of metal rods extruded from a press under the aforementioned conditions is no easy matter, so that there has heretofore not been much developed any such cutting apparatus.

SUMMARY OF THE INVENTION

The object of the present invention is to provide a travelling cutting machine capable of cutting to a prescribed length a metal rod immediately after being continuously manufactured by hot working, particularly by an extrusion press.

DETAILED DESCRIPTION OF THE INVENTION

Figure 1:
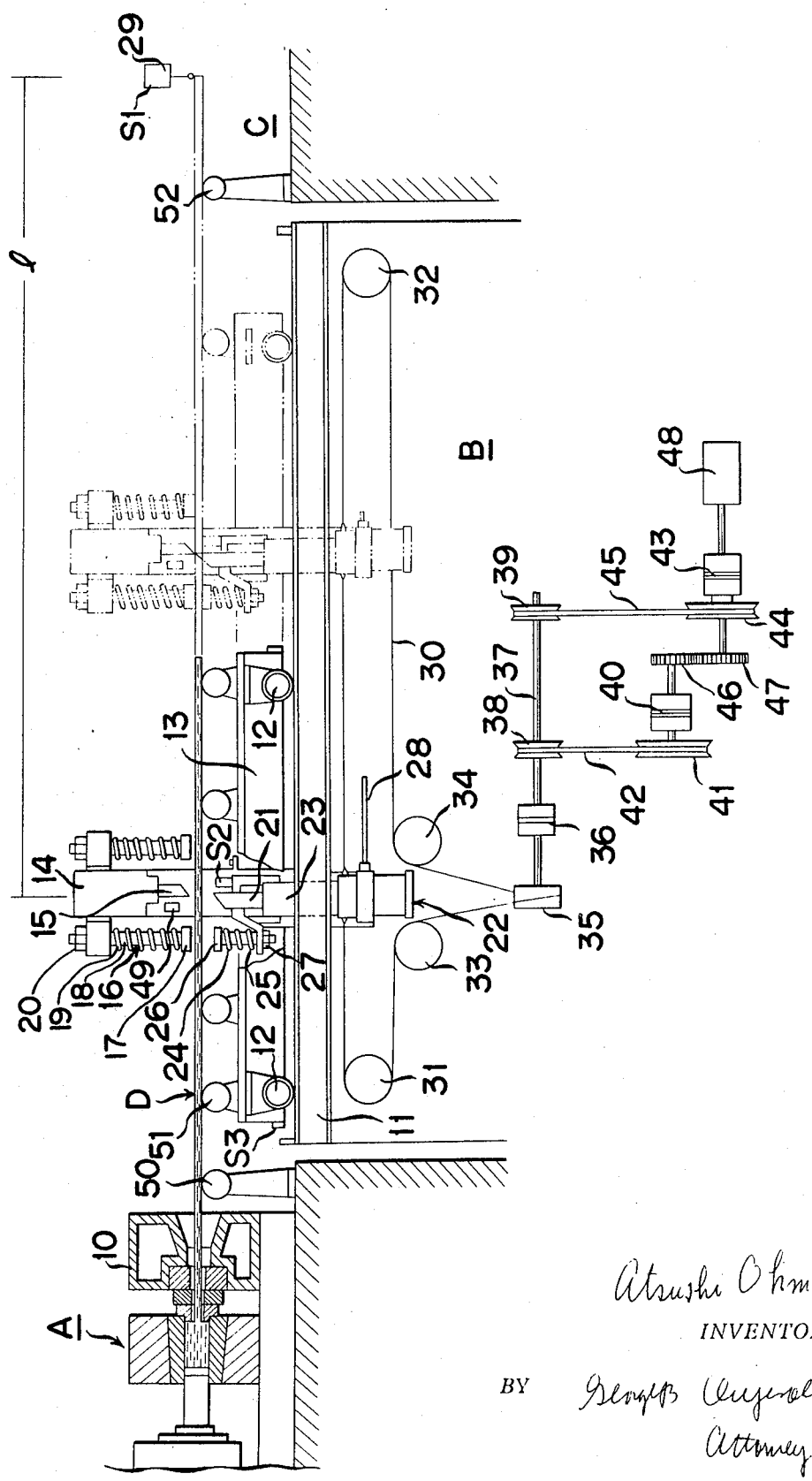
FIG. 1 is a schematic lateral view of a travelling cutting machine according to an embodiment of the present invention.

There will now be described the present invention by reference to the appended drawings. As shown in FIG. 1, there are linearly arranged in the order mentioned an extrusion press denoted as A for manufacturing a metal rod, for example, a round rod from a billet, a travelling cutting machine designated as B and cooling and storage equipment indicated by C. Description will first be given of the cutting machine B. The machine B has rails 11 laid in the direction of extruding a metal rod D. On the rails is placed a truck 13 which is made freely movable by a pair of wheels 12 provided at the forward and rear ends respectively. Substantially in the center of the truck 13 is projectingly set up a gate-type cutter edge holding pedestal 14. At the upper part of the cutter edge holding pedestal 14 is disposed a fixed cutter edge 15 whose end is directed downward and a pair of holding members 16 positioned adjacent thereto. The holding member 16 comprises a holding end face 17, a support rod 18 projecting behind it, and a spring 19 penetrated by said rod 18, and is so arranged as to have its vertical operation adjusted by a screw 20. Right below the fixed cutter edge 15 is positioned a movable cutter edge 21. This movable cutter edge 21 is fitted to the piston rod 23 of an oil pressure mechanism 22 suspended below the truck 13. Further below the holding member 16 is disposed another holding member 24 whose base portion is fitted to the movable cutter edge 21 by means of a projecting member. The holding end face 26 of the latter holding member 24 is always urged upward by the action of a spring 25. This holding member 24 is provided with an adjusting screw 27 as is the aforesaid holding member 16. On the other hand, the oil pressure mechanism 22 is connected through an oil feed pipe 28 to an oil source (not shown), which is provided with a solenoid actuated by the later-described main switch 29. To the oil pressure mechanism 22 are attached both ends of a drive cable 30 stretched along the rails 11. The cable 30 passes around guide wheels 31 and 32 respectively disposed below each end of the rails 11, then around separate wheels 33 and 34 arranged close to each other and finally around a main wheel 35. The main wheel 35 is connected to an electromagnetic clutch 36 concentrically positioned therewith. From the electromagnetic clutch 36 projects a driven axle 37, to which are spatially attached a pair of wheels 38 and 39 of the same diameter. One of these wheels 38 is connected by means of a belt 42 to the armature 41 of an electromagnetic clutch 40 for a backward run. The other 39 of said wheels is connected by means of a belt 45 to the armature 44 of an electromagnetic clutch 43 for a forward run. The electromagnetic clutches 40 and 43 interlock with each other through gears 46 and 47 of different diameters. The gear 46 coaxial with the electromagnetic clutch 40 has a smaller diameter than the gear 47 coaxial with the electromagnetic clutch 43. This difference in the diameters causes the truck to travel at a greater speed in its backward run than in its forward run. The forward run electromagnetic clutch 43 is connected to a drive motor 48. The electric current passes through a circuit shown in FIG. 2. Character C$l$1 denotes a line associated with the electromagnetic clutch 43, and S1 a switch connected to C$l$1 which jointly works with the main switch 29, and also with a switch (not shown) to operate an oil course. C$l$2 represents a line related to the electromagnetic clutch 40 for a backward run, and S2 a switch connected to C$l$2 which acts as a lower limit switch operable after the rise of the movable cutter edge 21. S3 denotes a switch connected to the electromagnetic clutch 36 and positioned at the rear end of the truck 13. When the truck reaches either end of the rails 11, the switch S3 is operated to stop its travel.

Figure 2:
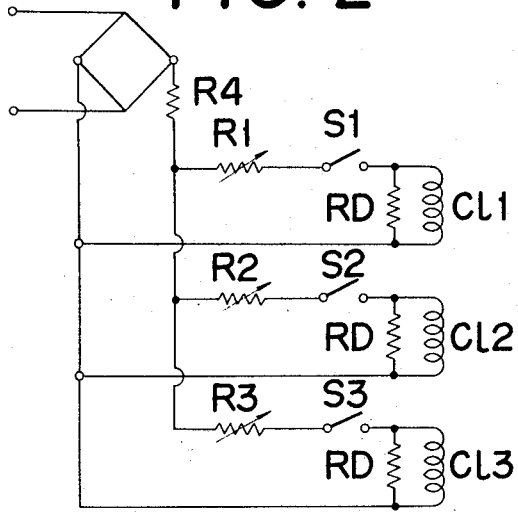
FIG. 2 is a diagram of an electric circuit involved in the drive means of FIG. 1.

Characters R1 to R3 of FIG. 2 are resistors for adjusting the torques of the electromagnetic clutches 40, 43 and 36. Numeral 49 of FIG. 1 denotes an upper limit switch which controls the rise of the movable cutter edge 21. Numeral 50 is a guide roller positioned immediately before a die 10 and numeral 51 shows a guide roll set above the truck 13. A guide roll 50 disposed ahead of the guide roll 51, the extrusion press A and a guide roll 52 placed in the cooling and storage equipment C are linearly arranged in the same plane and intended to allow a metal rod D extruded from the die 10 to travel without being subjected to any deformation. Ahead of the cutting machine B is positioned a main switch 29, which is allowed to be freely shifted in accordance with the length to which the extruded metal rod is to be cut. Once said length is determined, the main switch 29 is fixed at a prescribed space $l$ from the cutting machine B so as to assure said length until the cutting cycle is brought to an end.

There will now be described the operation of the travelling cutting machine of the present invention by reference to FIGS. 1 and 2. A metal rod, for example, a round rod D extruded from the die 10 of the press A is continuously supplied through the guide rolls to the cutting machine B, the furthest end of the rod being brought up to the cooling and storage equipment C. At this time, the motor 48 is set at the maximum velocity at which the metal rod D is extruded by the press A (namely, the velocity at which the truck 13 is made to travel by the motor 48). When the furthest end of the metal rod D has travelled a prescribed distance $l$, the main switch 29 is operated. Then the switch S1 is closed, the forward run electromagnetic clutch 43 is actuated and the rotating force of the motor 48 is transmitted through the belt 45 to the driven axle 37, causing the truck 13 to begin its travel on the rails 11 by means of the drive cable 30 connected to the truck. At the same time the solenoid of the oil source is actuated to furnish the oil pressure mechanism 22 with the required oil pressure, causing the movable cutter edge 21 to rise which is fitted to the top end of the piston rod 23. When the travelling velocity of the truck 13 is made to accord with that of the metal rod D, the holding member 24 attached to the movable cutter edge 21 and the holding member 16 first hold the metal rod D and then the tip of the movable cutter edge 21 touches the metal rod D to cut it together with the fixed cutter edge 15. The state of the cutting machine B at this time is indicated by the dot-dash line of FIG. 1. When the movable cutter edge 21 reaches its rising limit, then the upper limit switch 49 is actuated to release the solenoid of the oil source, causing the movable cutter edge 21 to be brought down. Then the lower limit switch works to release the forward run electromagnetic clutch 43, and immediately after the backward run electromagnetic clutch 40 transmits the rotation of the motor 48 to the driven axle 37 by means of the reversing gears 46 and 47, thereby to bring the truck back to its original position along the rails 11 due to the reverse rotation of the driven axle 37. In this case, the different numbers of the teeth of the gears 46 and 47 cause the truck to make its backward run more quickly than its forward run. When the truck resumes its original position the switch S3 works to release the electromagnetic clutch 40, and the electromagnetic clutch 36 is operated to stop the rotation of the driven axle 37, instantly bringing the truck to rest. If, during the aforementioned operation, the truck 13 should travel faster than the extruded metal rod D, the truck will be subject to an increased load. Though such increase is very slight, it will affect the engaged condition of the forward run electromagnetic clutch 43, namely, cause said clutch to slide with the resultant decrease in the travelling velocity of the truck 13. Thus the truck 13 is always made to move at a velocity coordinated with that of the metal rod D. The aforesaid forward run electromagnetic clutch 43 is designed to match the torque with which the truck 13 is driven. If, therefore, the truck runs quicker than the metal rod D, there will arise a force to pull the metal rod D by the paired holding members 16 and 24. However, if the travelling velocity of the truck 13 is prevented from too widely varying from that of the metal rod D so as to cause said pulling force to fall within the allowable range of the tension of the metal rod D, then the rod D will be saved from deformation.

Figure 4B:
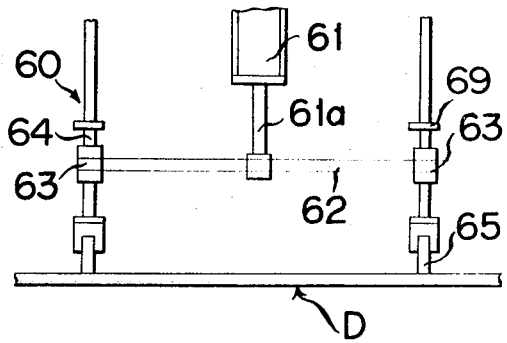
FIG. 4B is a plan view of the drive mechanism along of FIG. 4A.
Figure 4A:
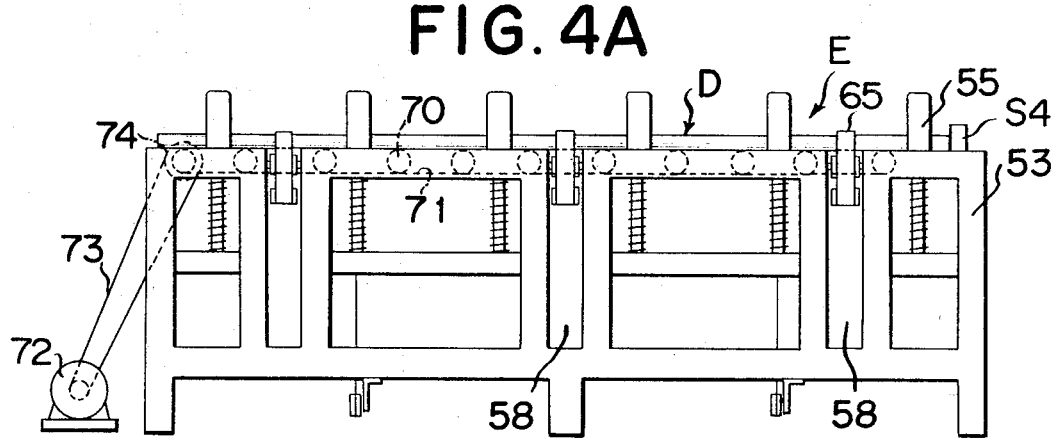
FIG. 4A is a lateral view of a means for laterally shifting a cut metal rod to the cooling and storage equipment.
Figure 4C:
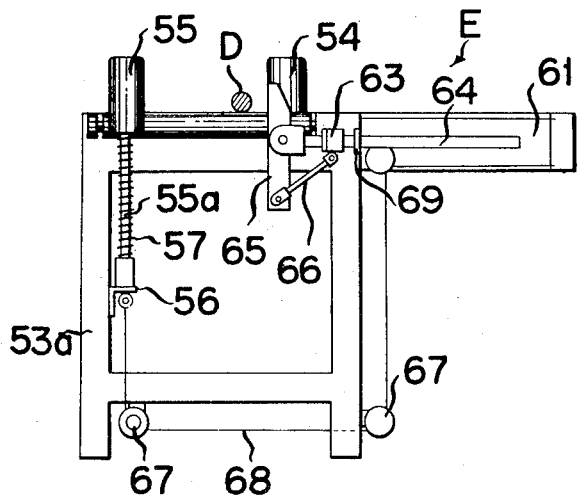
FIG. 4C is a lateral view of FIG. 4A.

The metal rod D thus cut should be brought to the cooling and storage equipment C so as to prevent the succeeding rod from being obstructed in its travel. To do this, it is necessary to shift the position of the cut rod in a transverse direction. There is presented in FIGS. 4A to 4C an illustration of such transverse shifting means.

There will now be described this shifting means. There is provided a long bed 53 in the direction in which the metal rod D travels. On one side of the upper part of the bed 53 are spatially erected stationary guide roller 54, and on the other side vertically movable guide roller 55. Below the bottom end of each of the movable guide roller 54 is disposed an axle 55a which is so inserted as to move vertically into a bracket 56 fitted to the legs 53a of the bed 53. This axle 55a is always pushed upward by a coil spring 57 attached to the outer circumference of the axle 55a. At right angles to the lengthwise direction of the bed 53 are spatially formed grooves 58 in each of which is disposed a push means 60 for shifting the position of a metal rod D in a transverse direction. The push means 60 consists of an air cylinder 61, a rod 62 fitted to the cylinder axle 61a at right angles and a ring-shaped slide pipe 63 attached to both ends of the rod 62. Slidably through the slide pipe 63 is inserted an axle 64 having a stopper 69 at its middle portion. To the outermost end of the axle 64 is rotatably fitted a push arm 65. There is provided a connecting rod 66 bridging the bottom end of the arm 65 slide pipe 63 in a manner to cause both ends of the connecting rod 66 to be rotatably fitted to said arm and pipe respectively. The slide pipe 63 and the bottom end of the axle 55a are connected together by a wire 68 stretched along a part of the outside of the bed 53 by passing about reels 67. Also, there are provided rod-forwarding rollers 70 which are connected to each other by endless chain 71 to convey a cut rod. These rod-forwarding rollers are driven by a motor 72 by means of a belt 73 and a wheel 74. At the end portion of the bed 53 is positioned a limit switch S4 to actuate the air cylinder 61.

According to the aforementioned arrangement, when the end portion of a metal rod D carried along the bed 53 touches the limit switch S4, the forward movement of the air cylinder 61 causes the push arm 65 to be brought ahead by means of the rod 62 a slide pipe 63 so as to shift the position of a metal rod D in a transverse direction. At this time the movement of the slide pipe 63 causes the axle 55a to be pulled down by means of the wire 68 and consequently the movable guide roller 55 to be brought down from the bed plane, so that the cut metal rod is not obstructed in falling off into a separately provided receptacle (not shown).

Conversely when the air cylinder 61 is pulled back, the slide pipe 63 is also pulled back, causing the push arm 65 to incline forward by means of the connecting rod 66. The push arm 65 is brought back to its original position in such inclined state and with its head not projecting above the bed plane. The return of the slide pipe 63 causes the movable guide roller 55 to be brought up to its original position.

Figure 3:
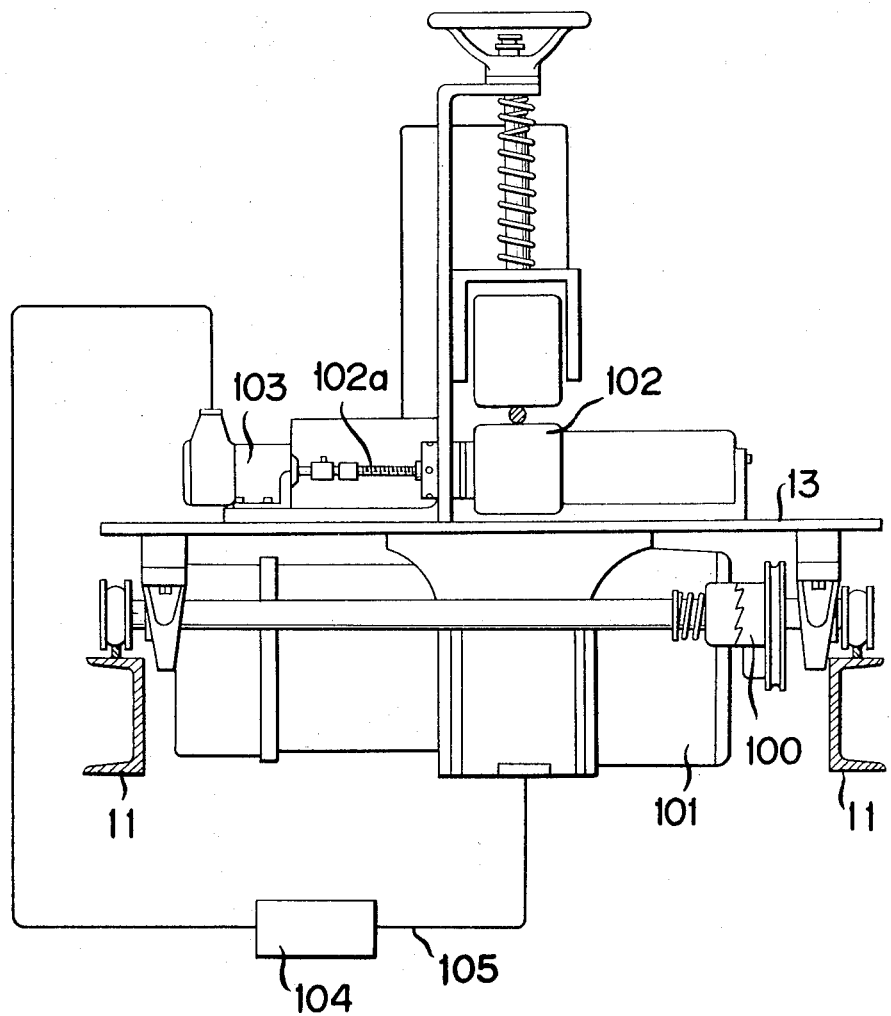
FIG. 3 is an elevation of the drive means of a cutting machine according to another embodiment of the invention.

FIG. 3 presents another embodiment of the present invention. This embodiment uses an eddy-current coupling motor 101 instead of the electromagnetic clutch 36. The travelling velocity of a metal rod D is detected by a guide wheels, and the resultant signal causes the truck of a cutting machine B to move. To describe with the same parts as in the preceding embodiment denoted by the same numerals, the truck 13 mounted on rails 11 is driven by an eddy-current coupling motor 101 using a clutch 100 which is used simply to change the rotation of the motor. The metal rod D extruded from the press A is made to pass between a pair of wheels 102. These wheels 102 are connected to the flexible axle 102a of a generator 103. The generator 103 is connected to the motor 101 through a control circuit 104 and a lead 105. Thus, the travelling velocity of the metal rod D is detected in the form of an electric current by the rotation of the paired wheels 102, namely, by that of the generator. The current is conducted to the control circuit 104, and the current of the motor 101 is also introduced to said control circuit 104. Accordingly, where the truck 13 is found to travel faster than the metal rod D, the magnetic pole connected to the output shaft and the drum housed in said eddy-current coupling motor are so actuated as to slow down the output shaft, and cause the travelling velocity of the truck 13 to accord with that of the metal rod D. Since the pulling force fails within the allowable range of the tension of the metal rid D, the rod D will be saved from deformation

I claim:

1. A travelling cutting machine for use with an extrusion press comprising in combination;
    a. a truck (13) movable in the direction in which a continuously manufactured rod (D) travels;
    b. a cutting machine (B) mounted on the truck (13) provided with cutter edges for cutting said rod (D), hydraulic pressure means (22) coupled to said cutter edges and switch means (49) to cut off said pressure means (22) when at least one of said cutter edges reaches a predetermined position;
    c. drive means including a motor (48) and clutch mean for coordinating the travelling velocity of the truck (13) with that of the travelling metal rod;
    d. switch means and roller means determining the length of the rod to be cut including a main switch (29) freely shifted to determine the length of the rod to be cut and resistors (R1 and R3) adjusting the torque of the clutch means; and
    e. shifting means including a limit switch (S4) for sensing the end of a travelling rod, an air cylinder (61) responsive to said limit switch, a push arm and slide pike (65, 63) actuated by said air cylinder to shift the cut rod and make room for the next piece to be cut.

2. A travelling cutting machine according to claim 1 comprising a pair of wheels (102) for detecting the travelling velocity of the extruded metal rod thereby to actuate the clutch means.

3. A machine as claimed in claim 1, said drive means including a motor (48), a forward clutch (36) a reverse clutch (40) and gearing driven by said motor, the gearing being so arranged as to cause a backward run more quickly than the forward run, said motor during the forward run causing said truck to travel forward at maximum speed, said forward clutch (36) sliding if the speed of the truck (13) is faster than that of the rod (D).